(12) United States Patent  
Bilski et al.

(10) Patent No.: US 8,685,243 B2
(45) Date of Patent: Apr. 1, 2014

(54) FLUID FILTER

(71) Applicant: Fram Group IP LLC, Lake Forest, IL (US)

(72) Inventors: Gerard W. Bilski, Perrysburg, OH (US); Michael S. Lynch, Fostoria, OH (US)

(73) Assignee: Fram Group IP LLC, Lake Forest, IL (US)

( * ) Notice: Subject to any disclaimer, the term of this patent is extended or adjusted under 35 U.S.C. 154(b) by 0 days.

(21) Appl. No.: 13/737,418

(22) Filed: Jan. 9, 2013

(65) Prior Publication Data

US 2013/0118967 A1 May 16, 2013

Related U.S. Application Data

(63) Continuation of application No. PCT/US2012/030543, filed on Mar. 26, 2012.

(60) Provisional application No. 61/499,395, filed on Jun. 21, 2011.

(51) Int. Cl.
*B01D 35/30* (2006.01)
*B01D 27/08* (2006.01)
*B01D 35/28* (2006.01)

(52) U.S. Cl.
USPC ........ 210/232; 210/416.5; 210/435; 210/437; 210/440; 210/443; 210/450; 210/455; 210/457; 210/DIG. 17

(58) Field of Classification Search
None
See application file for complete search history.

(56) References Cited

U.S. PATENT DOCUMENTS

| 3,224,591 | A | * | 12/1965 | Sawyer | 210/440 |
|---|---|---|---|---|---|
| 5,207,131 | A | | 5/1993 | Pool et al. | |
| 5,353,666 | A | | 10/1994 | Rogers | |
| 5,490,930 | A | * | 2/1996 | Krull | 210/443 |
| 5,845,552 | A | | 12/1998 | Piascik | |
| 5,876,600 | A | | 3/1999 | Matsubara et al. | |
| 5,906,740 | A | * | 5/1999 | Brown et al. | 210/450 |
| 5,928,513 | A | * | 7/1999 | Bradford | 210/443 |
| 6,217,762 | B1 | | 4/2001 | Rooney et al. | |
| 2005/0056124 | A1 | | 3/2005 | Zulauf | |
| 2007/0034631 | A1 | | 2/2007 | Minowa et al. | |
| 2008/0006573 | A1 | * | 1/2008 | Wolf et al. | 210/450 |

FOREIGN PATENT DOCUMENTS

JP 10151303 6/1998
KR 1020050070396 7/2005

OTHER PUBLICATIONS

International Search Report and Written Opinion of PCT/US2012/030543 dated Oct. 15, 2012.

* cited by examiner

*Primary Examiner* — Benjamin Kurtz
(74) *Attorney, Agent, or Firm* — Erin J. Fox; Barnes & Thornburg LLP

(57) ABSTRACT

A fluid filter such as an oil filter for a vehicle is provided. The fluid filter includes a body. A plate is coupled to one end of the body, the plate having a first surface and a threaded portion having a thread pitch. A seal is disposed adjacent the plate, the plate having a second surface opposite the plate. A stop member is disposed adjacent the plate, the stop member having a third surface offset from the second surface.

21 Claims, 2 Drawing Sheets

FLUID FILTER

CROSS REFERENCE TO RELATED APPLICATIONS

This application is a continuation of International Application number PCT/US2012/030543 filed Mar. 26, 2012, which claims the benefit of U.S. Provisional Patent Application No. 61/499,395 filed Jun. 21, 2011, the entire contents of which are incorporated herein by reference.

BACKGROUND OF THE INVENTION

The subject matter disclosed herein relates to a fluid filter and in particular to a removable automotive fluid filter having features for assisting installation.

Vehicles having internal combustion engines, such as automobiles for example, typically have replaceable filters that remove contaminants from the fluid. For oil lubrication fluids, the oil will be periodically drained and replaced with new oil. The oil lubrication system includes a filter that removes particulates from the oil during operation. Usually, this filter is replaced at the same time the oil is changed, since the filtering medium within the filter will gradually become less effective over time as the particulate becomes trapped within the filter.

The removal and installation of an oil filter is usually accomplished using a specifically designed tool, sometimes referred to as a filter wrench. Since the lubrication system is under pressure, the oil filter is installed to a particular torque level to ensure a desired seal between the filter and the engine. Typically, the installation requires the operator to turn the filter a predetermined amount, such as ¾ to 1 turn once the filter seal contacts the engine surface. It should be appreciated that under tightening may result in oil leakage and over tightening the oil filter may result in difficulty in removing the oil filter during the next oil change.

Accordingly, while existing automotive fluid filters are suitable for their intended purposes, the need to improvement remains particularly in providing a fluid filter that assists the operator in installing the filter in a desired location.

BRIEF DESCRIPTION OF THE INVENTION

According to one aspect of the invention, a fluid filter is provided. The fluid filter includes a body and a plate coupled to one end of the body, the plate having a first surface and a threaded portion having a thread pitch. A seal is disposed adjacent the plate, the plate having a second surface opposite the plate. A stop member is disposed adjacent the plate, the stop member having a third surface offset from the second surface.

According to another aspect of the invention, another fluid filter is provided. The fluid filter includes a body having a closed first end and a second end. A tapping plate is coupled to the second end, the tapping plate having a first surface and a threaded portion having a thread pitch. A channel member is coupled between the tapping plate and the body, the channel member defining an area with an open side opposite the first end. A sealing member is disposed within the area, the sealing member having a second surface offset a first distance from the open side. A stop member is coupled to the channel member, the stop member having a third surface disposed between the first surface and the second surface.

According to yet another aspect of the invention, yet another fluid filter is provided. The fluid filter includes a body having a closed first end and a second end. A channel member having an outer diameter is coupled to the second end, the channel member defining an annular slot having an open side. A seal member is disposed within the annular slot, the seal member having first surface offset from the open side. A stop member is coupled to an inner diameter of the channel member, the stop member having a second surface disposed between the open side and the first surface.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Fluid filters are used with in a wide variety of applications, such as internal combustion engines for example, to remove contaminants such as a particulate from a fluid stream. The fluid filters are installed to provide a desired level of sealing between the fluid filter and the corresponding equipment (e.g. the engine). It is desirable to have the fluid filter installed without under tightening, which could result in leakage, or over tightening which could make it difficult to remove the filter after a period of operation. Embodiments of the present invention include a member that allows the operator to tighten the filter against a positive stop that provides for a desired sealing level.

Figure 1:
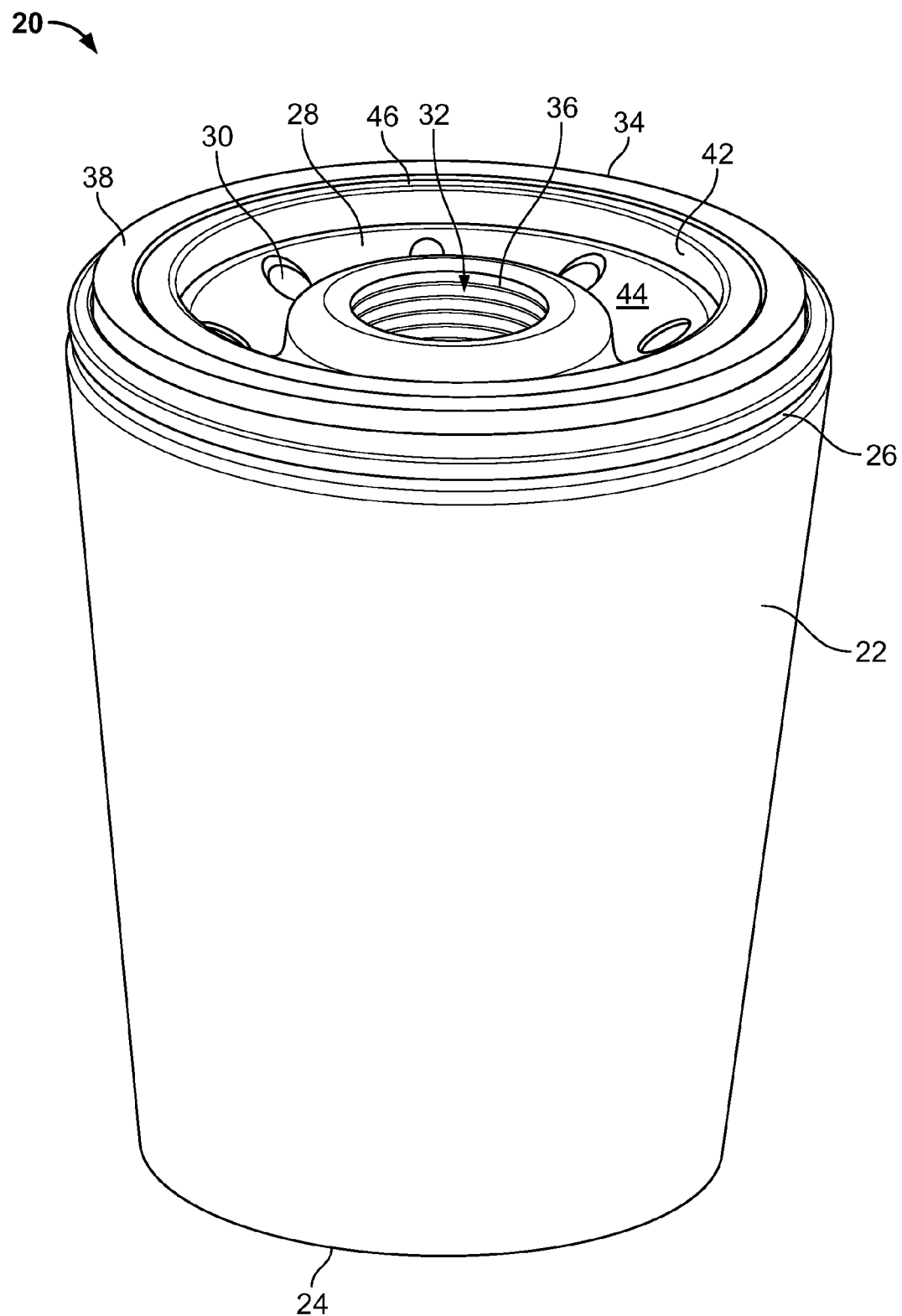
FIG. 1 is a perspective view of a fluid filter in accordance with an embodiment of the invention.
Figure 2:
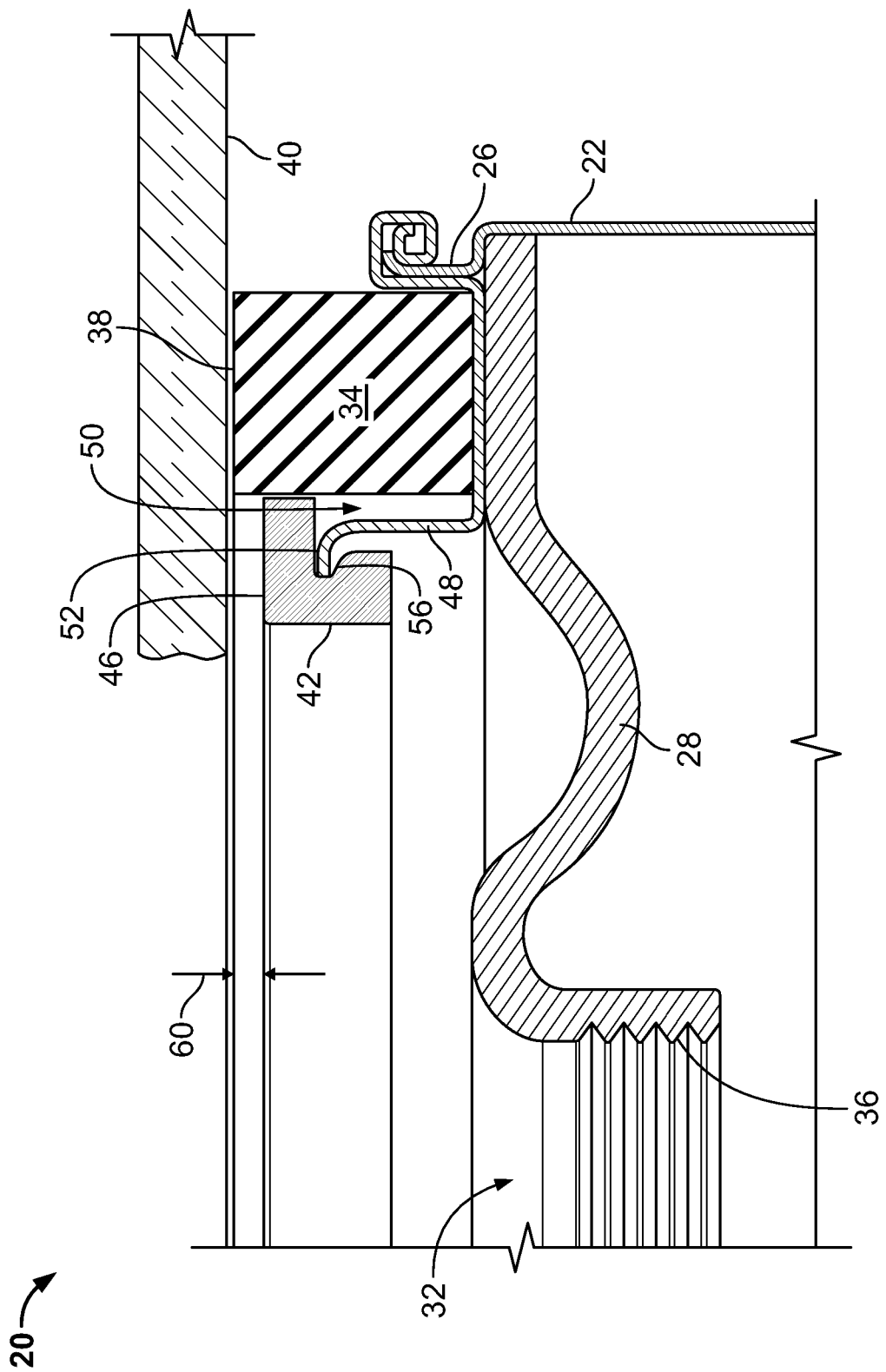
FIG. 2 is a partial side sectional view of the fluid filter of FIG. 1.

Referring to FIGS. 1 and 2, there is shown a fluid filter 20, such as a replaceable oil filter for an internal combustion engine. The filter 20 includes a generally hollow cylindrical body 22 that defines a space for a filter medium (not shown). One end 24 of the body 22 is closed. The end 24 may include one or more surfaces that allow a user to couple a tool to the filter 20. An opposite end 26 is enclosed by a tapping plate 28. The tapping plate 28 may be coupled to the body 22 by a crimped connection for example. The tapping plate 28 may include one or more openings 30, 32 to allow a working fluid to enter and exit the filter 20. In one embodiment, the opening 32 includes a threaded portion 36 that is sized to couple to a threaded member on an engine. In one embodiment, the threaded portion 36 has a ¾ inch major diameter with 16 threads per inch or ¹³⁄₁₆ inch diameter with 16 threads per inch (American Standard). In embodiments having a metric thread, the threaded portion 36 may be sized as a 20 mm×1.5, 18 mm×1.5, or 22 mm×1.5 thread (ISO Metric).

Coupled to the end 26 is a seal, such as gasket 34. The gasket 34 forms a seal between the filter 20 and mating system (e.g. an internal combustion engine). It should be appreciated that the integrity of the seal formed by the gasket 34 on an adjoining surface will depend on the amount of compression of the gasket 34. It is desirable to have the compression fall within a range to avoid under compressing or over compressing the gasket. In an automotive application a compression created by rotating the filter 20 three-quarters to one turn after the contact surface 38 engages the surface 40 (FIG. 2). It should be appreciated that in many applications, it is difficult for the installer to see the filter and judge whether the filter has been turned the desired amount.

In the exemplary embodiment, the filter 20 includes a stop member 42. The stop member 42 is disposed between the contact surface 38 and a surface 44 of the tapping plate 28. The stop member 42 includes a surface 46 that is offset from the contact surface 38. During installation, the stop member 42 contacts the surface 40 preventing further tightening of the filter 20. Therefore, the amount of offset between the surfaces 38, 46 determines the amount of compression of the gasket 34. In the exemplary embodiment, the offset is about three-quarters of the thread pitch of threaded portion 36. In one embodiment, the offset is about 0.045 inches (1.145 mm).

Referring to FIG. 2 a sectional view is shown of fluid filter 20. A channel member 48 may be coupled, such as by welding for example, between the tapping plate 28 and the body 22. The channel member 48 has a generally thin walled body with an inner diameter adjacent the opening 32 and an outer diameter adjacent the body 22. The inner diameter and outer diameter define an annular channel 50 having an open end. The channel 50 is sized to receive the gasket 34 such that the contact surface 38 is offset from the open end of the channel 50.

The channel member 48 further includes a lip 52 disposed along an inner diameter. In one embodiment the stop member 42 is coupled to the inner diameter of the channel member 48. In one embodiment, the stop member 42 has a slot 56 is sized to receive the lip 52. Adjacent the slot 56 the stop member 42 has the surface 46 that is offset from the contact surface 38 by a distance 60. In one non-limiting embodiment, the distance 60 is sized to be about three-quarters of the pitch of threaded portion 36. In one non-limiting embodiment, the distance 60 is about 0.045 inches (1.145 mm). The stop member 42 may be made from a suitable light-weight, low cost moldable plastic material, such as nylon for example. The use of nylon as a material for the stop member 42 may provide advantages in that it reduces the risk of marring the interface with surface 40.

To install the filter 20, the maintenance personnel first remove the old filter from the system (e.g. the internal combustion engine, not shown). With the old filter removed, the personnel couple the threaded portion 36 to the corresponding threaded stem on the system. The personnel continue to rotate the filter 20 until the surface 58 contacts the surface 40 of the system. Once the surfaces 40, 46 are in contact, the further rotation of the filter 20 will be inhibited and the personnel will know that the gasket 34 has been compressed to the desired amount. It should be appreciated that the filter 20 provides advantages in allowing a desired seal to be formed between the filter and the system without the installer having to monitor the number of turns or the amount that the filter 20 is rotated.

It should be appreciated that while the embodiments herein describe the stop member 42 as being arranged radially inward from the gasket 34, this is for exemplary purposes and the claimed invention should not be so limited. In one embodiment, the stop member is arranged radially outward from the gasket. In still another embodiment, the stop member is integrated into the channel member 48. In still another embodiment, the stop member is integrated into the gasket 34. In yet another embodiment, the stop member is coupled or integrated into the tap plate. In still another embodiment, the stop member is integrated into the body 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fluid filter comprising:
a body;
a plate coupled to one end of the body, the plate having a first surface and a threaded portion having a thread pitch;
a seal disposed adjacent the plate, the seal having a second surface opposite the plate;
a stop member disposed adjacent the plate, the stop member having a third surface offset from the second surface;
wherein the third surface is offset from the second surface by amount between about three-quarters and about one thread pitch.

2. The fluid filter of claim 1 wherein the third surface is offset from the second surface by about an amount equal to three-quarters of the thread pitch.

3. The fluid filter of claim 2 wherein the threaded portion has 16 threads per inch.

4. The fluid filter of claim 1 wherein the offset is about 0.045 inches.

5. The fluid filter of claim 1 wherein the third surface is disposed between the first surface and the second surface.

6. The fluid filter of claim 5 wherein the stop member is made from a plastic material.

7. A fluid filter comprising:
a body having first and second ends;
a plate coupled to the first or the second end of the body, the plate having a first surface and a threaded portion having a thread pitch;
a channel member disposed adjacent the plate, the channel member defining an area with an open side opposite the first end and the channel member further including first and second peripheral edges;
a sealing member disposed within the area, the sealing member having a second surface spaced a first distance from the open side; and,
a stop member having a slot within a radial outer periphery of the stop member, wherein the first peripheral edge of the channel member extends into the slot to retain the stop member such that the stop member extends radially inwardly from the first peripheral edge of the channel member, the stop member having a third surface disposed between the first surface and the second surface.

8. The fluid filter of claim 7 wherein the third surface is offset from the second surface by a second distance, the second distance being between about three-quarters and about one thread pitch.

9. The fluid filter of claim 8 wherein said first distance is larger than said second distance.

10. The fluid filter of claim 9 wherein the second distance is about 0.045 inches.

11. The fluid filter of claim 7 wherein the channel member includes a lip disposed on an inner diameter.

12. The fluid filter of claim 11 wherein the slot of the stop member is coupled to the lip.

13. The fluid filter of claim 12 wherein the stop member is made from a plastic material.

14. A fluid filter comprising:
a body having first and second ends;
a channel member having an outer diameter coupled to the second end of the body, the channel member including first and second opposing side walls and a bottom wall connecting the first and second opposing side walls, wherein the first and second opposing side walls and the bottom wall define an annular slot having an open side;
a seal member disposed within the annular slot, the seal member having a first surface spaced from the open side; and,
a stop member attached to the second side wall of the channel member such that the stop member extends radially outwardly from the second side wall, the stop member having a second surface disposed between the open side and the first surface.

15. The fluid filter of claim 14 wherein the second surface is offset from the first surface by about 0.045 inches.

16. The fluid filter of claim 14 wherein the channel member includes a lip portion along the inner diameter.

17. The fluid filter of claim 16 wherein the stop member includes a slot disposed along an outer diameter.

18. The fluid filter of claim 17 wherein the lip portion is disposed within the stop member slot.

19. The fluid filter of claim 14 further comprising a tapping plate coupled to the body on the second end, the tapping plate including a threaded portion having a thread pitch.

20. The fluid filter of claim 19 wherein the second surface is offset from the first surface by between about three-quarters and about one thread pitch.

21. The fluid filter of claim 7, wherein the stop member includes a vertical segment disposed adjacent an inner radial periphery of the second peripheral wall, a horizontal segment perpendicular to the vertical segment and extending radially outwardly from the vertical segment, wherein the slot is formed between the vertical and horizontal segments.

* * * * *